United States Patent
Ikegami et al.

(10) Patent No.: US 12,139,013 B2
(45) Date of Patent: Nov. 12, 2024

(54) TRANSPORTATION MOVING BODY, AND AUTOMOBILE

(71) Applicant: DAIKIN INDUSTRIES, LTD., Osaka (JP)

(72) Inventors: Shuji Ikegami, Osaka (JP); Takayuki Kawano, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 613 days.

(21) Appl. No.: 17/332,750

(22) Filed: May 27, 2021

(65) Prior Publication Data

US 2021/0284024 A1  Sep. 16, 2021

Related U.S. Application Data

(63) Continuation of application No. PCT/JP2019/045809, filed on Nov. 22, 2019.

(30) Foreign Application Priority Data

Nov. 28, 2018 (JP) ................................. 2018-222099

(51) Int. Cl.
*B60K 35/00* (2024.01)
*B60J 3/04* (2006.01)
(Continued)

(52) U.S. Cl.
CPC ................. *B60K 35/00* (2013.01); *B60J 3/04* (2013.01); *B60L 8/003* (2013.01); *B60K 35/23* (2024.01);
(Continued)

(58) Field of Classification Search
CPC ............ B60K 35/00; B60K 2370/1529; B60K 2370/176; B60K 2370/25; B60K 2370/37; B60K 2370/785; B60J 3/04; B60L 8/003
(Continued)

(56) References Cited

U.S. PATENT DOCUMENTS

| 8,418,477 B2 * | 4/2013 | Klein | B60H 1/00778 62/235.1 |
| 2009/0199572 A1 * | 8/2009 | Klein | B60H 1/00428 62/235.1 |

(Continued)

FOREIGN PATENT DOCUMENTS

| DE | 10 2012 109 794 A1 | 4/2014 |
| DE | 10 2017 206 304 A1 | 10/2018 |

(Continued)

OTHER PUBLICATIONS

International Search Report of corresponding PCT Application No. PCT/JP2019/045809 dated Jan. 28, 2020.
(Continued)

*Primary Examiner* — Krishnan Ramesh
(74) *Attorney, Agent, or Firm* — Global IP Counselors, LLP

(57) ABSTRACT

A traffic mover includes a mover body forming an accommodation space configured to accommodate a human. The mover body includes a light blocking member and a driving assistance unit. The light blocking member blocks light entering from a front side of the mover body in a moving direction of the mover body. The driving assistance unit enables the mover body to be driven when the light blocking member blocks a forward view of the human in the moving direction of the mover body.

20 Claims, 8 Drawing Sheets

(51) Int. Cl.
  *B60K 35/23* (2024.01)
  *B60K 35/28* (2024.01)
  *B60K 35/40* (2024.01)
  *B60K 35/60* (2024.01)
  *B60L 8/00* (2006.01)

(52) U.S. Cl.
  CPC ............ *B60K 35/28* (2024.01); *B60K 35/415* (2024.01); *B60K 35/60* (2024.01); *B60K 2360/176* (2024.01); *B60K 2360/25* (2024.01); *B60K 2360/785* (2024.01)

(58) Field of Classification Search
  USPC .......................................................... 701/36
  See application file for complete search history.

(56) References Cited

U.S. PATENT DOCUMENTS

| | | |
|---|---|---|
| 2015/0287861 A1 | 10/2015 | Sato et al. |
| 2017/0334455 A1 | 11/2017 | Asakura et al. |
| 2018/0204538 A1* | 7/2018 | Reckamp ............... B60K 37/04 |
| 2021/0402850 A1* | 12/2021 | Devienne ............ B60H 1/2218 |

FOREIGN PATENT DOCUMENTS

| | | |
|---|---|---|
| GB | 2545074 A | 6/2017 |
| JP | 63-242715 A | 10/1988 |
| JP | 11-38455 A | 2/1999 |
| JP | 2017-206196 A | 11/2017 |
| WO | 2012/118956 A2 | 9/2012 |
| WO | 2014/126065 A1 | 8/2014 |
| WO | 2017/022172 A1 | 2/2017 |
| WO | 2017061000 A1 | 4/2017 |

OTHER PUBLICATIONS

International Preliminary Report of corresponding PCT Application No. PCT/JP2019/045809 dated Jun. 10, 2021.
European Search Report of corresponding EP Application No. 19 88 8343.1 dated Jun. 30, 2022.
Media Center; "Bibliographic information for video seeing H Web Original"; May 2017.

* cited by examiner

TRANSPORTATION MOVING BODY, AND AUTOMOBILE

CROSS-REFERENCE TO RELATED APPLICATIONS

This is a continuation of International Application No. PCT/JP2019/045809 filed on Nov. 22, 2019, which claims priority to Japanese Patent Application No. 2018-222099, filed on Nov. 28, 2018. The entire disclosures of these applications are incorporated by reference herein.

BACKGROUND

Field of Invention

The present disclosure relates to a traffic mover and an automobile.

Background Information

An automobile of International Patent Publication No. 2017/061000 has a windshield on a front side in a moving direction of its body.

SUMMARY

A first aspect is directed to a traffic mover including a mover body forming an accommodation space configured to accommodate a human. The mover body includes a light blocking member and a driving assistance unit. The light blocking member blocks light entering from a front side of the mover body in a moving direction of the mover body. The driving assistance unit is configured to enable the mover body to be driven when the light blocking member blocks a forward view of the human in the moving direction of the mover body.

DETAILED DESCRIPTION OF EMBODIMENT(S)

Embodiments of the present disclosure will be described below with reference to the drawings. The following embodiments are merely exemplary ones in nature, and are not intended to limit the scope, applications, or use of the invention.

First Embodiment

A traffic mover of the present disclosure is configured as an automobile (10). The automobile (10) includes a vehicle body (20) which is a mover body.

Basic Configuration of Vehicle Body

Figure 1:
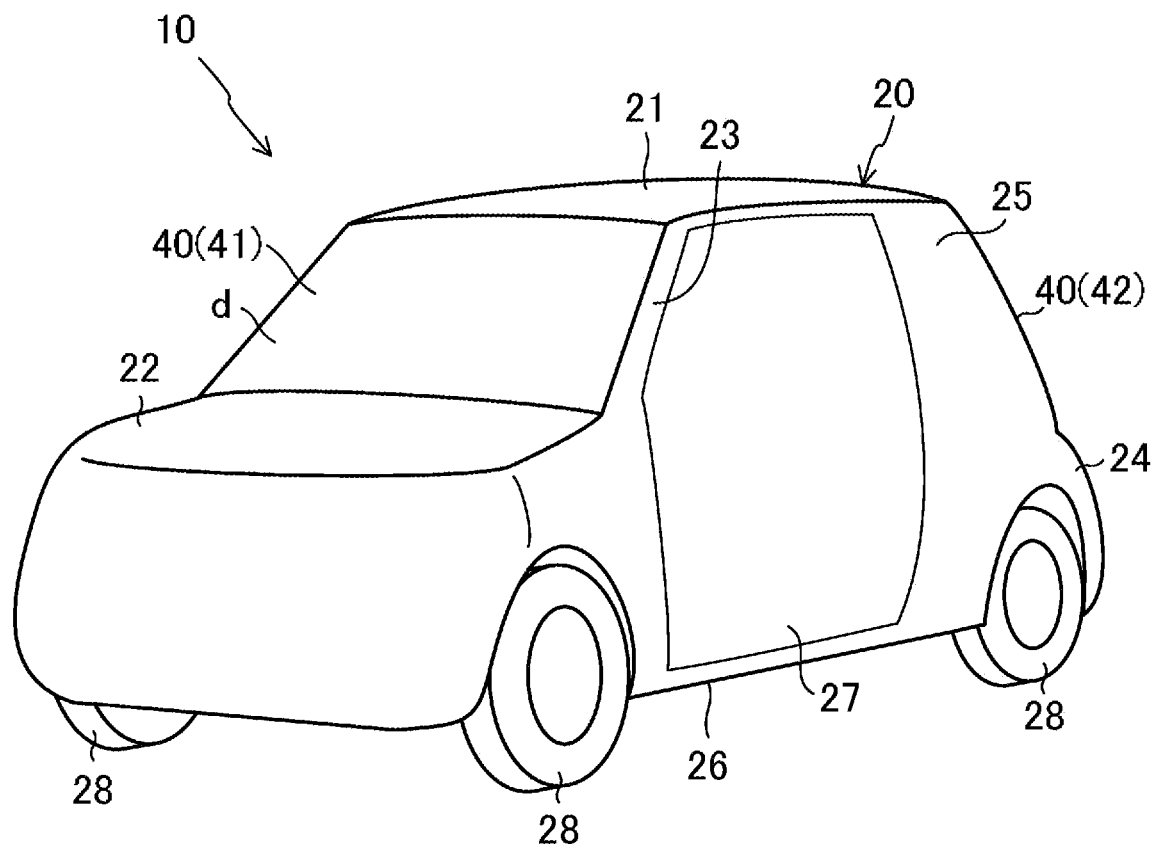
FIG. 1 is a perspective view illustrating a schematic configuration of an automobile according to a first embodiment.
Figure 1:
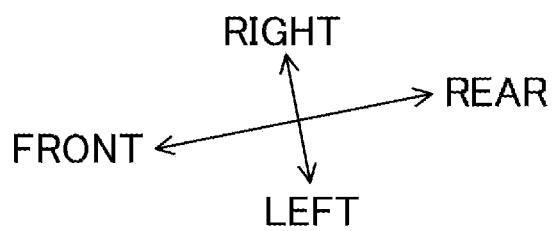
Figure 2:
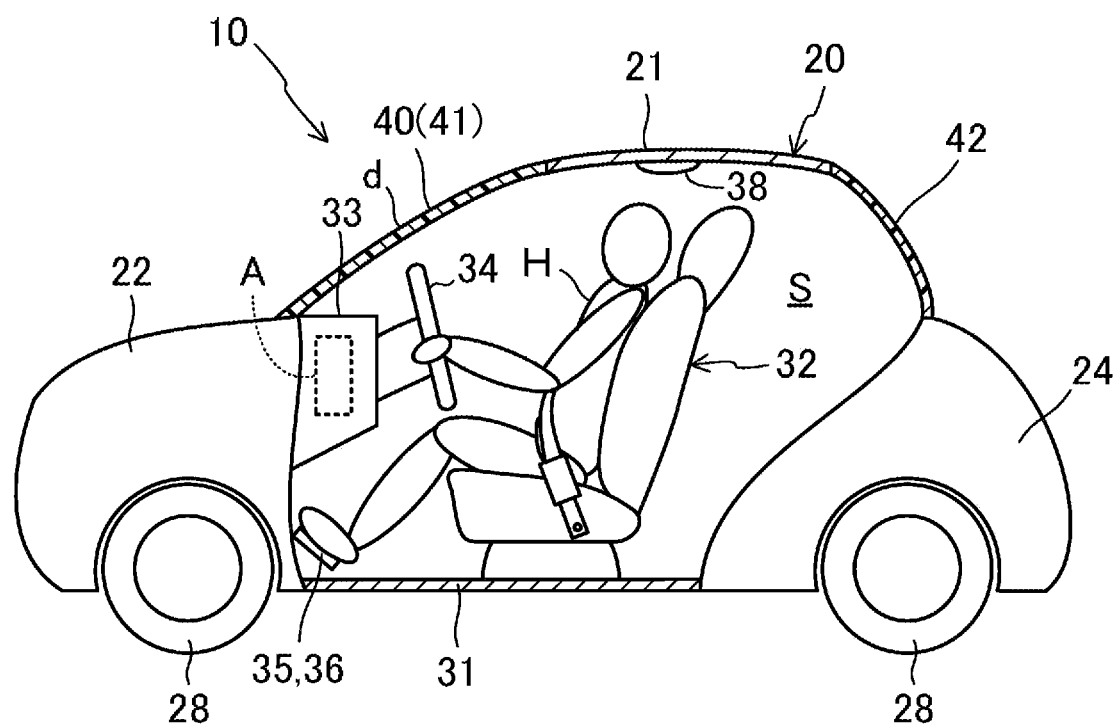
FIG. 2 is a partial cross-sectional view illustrating an internal structure of the automobile according to the first embodiment.

As shown in FIG. 1, the vehicle body (20) includes a roof (21), a front hood (22), two front pillars (23), a trunk lid (24), two rear pillars (25), and an underbody (26). As shown in FIG. 2, an accommodation space (S) that accommodates a human (H) is formed inside the vehicle body (20).

The roof (21) is formed above the accommodation space (S). The front hood (22) is formed forward of the accommodation space (S). One of the two front pillars (23) is formed on the front left of the accommodation space (S), and the other on the front right. The trunk lid (24) is formed behind the accommodation space (S). One of the two rear pillars (25) is formed on the rear left of the accommodation space (S), and the other on the rear right. A side door (27) is provided between the left front pillar (23) and the left rear pillar (25). Another side door (not shown) is provided between the right front pillar (23) and the right rear pillar (25). Four wheels (28) are provided at the bottom of the vehicle body (20).

As shown in FIG. 2, the accommodation space (S) includes a floor (31), a seat (32), an interior panel (33), a steering wheel (34), and pedals (35, 36). The floor (31) is provided on the bottom of the accommodation space (S). The seat (32) is placed on an upper surface of the floor (31). Only a single sheet (32) is provided in this example. Two or more seats (32) may be arranged in the right-to-left direction. The seats (32) may be arranged in two or more rows in the front-to-back direction. The interior panel (33) is disposed in front of the seat (32). An air conditioner (A) is installed inside the interior panel (33). The air conditioner (A) performs cooling and heating of the accommodation space (S). The air cooled or heated by the air conditioner (A) is supplied to the accommodation space (S) through an air outlet (not shown).

The steering wheel (34) is disposed in front of the seat (32). The steering wheel (34) is positioned to be gripped by hands of a human (H) sitting on the seat (32). The steering wheel (34) is an operation unit that adjusts the moving direction of the vehicle body (20). The steering wheel (34) is connected to a steering device.

The pedals (35, 36) are positioned below the steering wheel (34). The pedals (35, 36) include an accelerator pedal (35) and a brake pedal (36). The accelerator pedal (35) is an operation unit that adjusts the moving speed of the vehicle body (20). The accelerator pedal (35) is coupled to an accelerator. The brake pedal (36) is an operation unit that reduces the moving speed of the vehicle body (20) or stops the vehicle body (20). The brake pedal (36) is connected to a brake.

The vehicle body (20) is provided with a lighting device (38) that illuminates the inside of the accommodation space (S). The lighting device (38) is attached to a lower surface of the roof (21).

Light Blocking Member

The vehicle body (20) of the present example includes a light blocking member (40). The light blocking member (40) includes a first light blocking member (41) and a second light blocking member (42). As shown in FIGS. 1 and 2, the first light blocking member (41) is formed on the front side of the vehicle body (20). As shown in FIG. 2, the second light blocking member (42) is formed on the rear side of the vehicle body (20).

The first light blocking member (41) constitutes an inclined portion (d) of the vehicle body (20). The inclined portion (d) is surrounded by a front end of the roof (21), the pair of front pillars (23), and a rear end of the front hood (22). The inclined portion (d) is inclined downward as it extends forward in the moving direction. The inclined portion (d) is inclined to reduce air resistance to the vehicle body (20) moving forward.

The first light blocking member (41) blocks light entering the accommodation space (S) from the front side in the moving direction. The first light blocking member (41) is made of an opaque material. The first light blocking member (41) is made of a heat insulating material. The first light blocking member (41) is more heat insulating than a general windshield of an automobile.

The second light blocking member (42) is surrounded by a rear end of the roof (21), the pair of rear pillars (25), and a front end of the trunk lid (24). The second light blocking member (42) is inclined downward as it extends rearward.

The second light blocking member (42) blocks light entering the accommodation space (S) from the rear side of the vehicle body (20). The second light blocking member (42) is more heat insulating than a general rear window of an automobile.

Each of the right side door and left side door (27) of the present example has no side window and side glass, and entirely constitutes the light blocking member. The side door (27) blocks light entering the accommodation space (S) from the side of the vehicle body (20).

Strictly speaking, all the other components of the vehicle body (20) that define the accommodation space (S) constitute the light blocking member (40). The other components include the roof (21), the underbody (26), the front pillars (23), and the rear pillars (25). In this example, the light blocking member (40) entirely covers the accommodation space (S). This configuration of the vehicle body (20) can reduce the amount of heat input caused by the entry of sunlight into the accommodation space (S).

View Assistance Device

Figure 3:
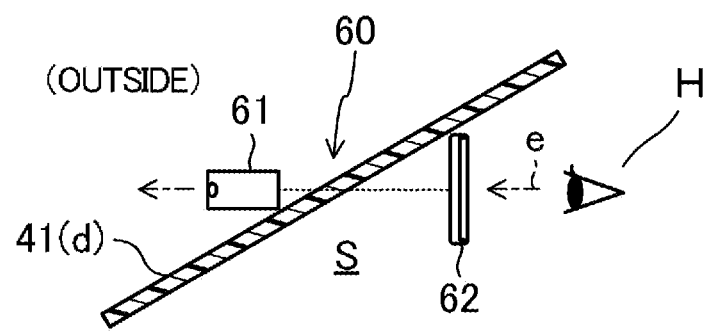
FIG. 3 is a configuration diagram schematically illustrating a first light blocking member and its surrounding structure according to the first embodiment.

As schematically shown in FIG. 3, the automobile (10) of the first embodiment includes a view assistance device (60). The view assistance device (60) constitutes a driving assistance unit. The view assistance device (60) enables the mover body (20) to be driven in a state where the light blocking member (40) blocks a forward view of the human (H) in the moving direction.

Specifically, the view assistance device (60) includes an imaging device (61), a monitor (62), and an operation unit. The operation unit includes the aforementioned steering wheel (34), accelerator pedal (35), and brake pedal (36). The operation unit is a device that allows the human to operate to drive the vehicle body (20).

The imaging device (61) is disposed outside the vehicle body (20). The imaging device (61) takes images of an external environment of the vehicle body (20). The imaging device (61) at least takes images on the front side of the imaging device (61) in the moving direction. The imaging device (61) is configured as a video camera having a lens facing forward.

The monitor (62) is positioned to be visible to the human (H). The monitor (62) of the present example is positioned between the seat (32) and the steering wheel (34). The monitor (62) is a display unit that displays an image to the human (H) sitting on the seat (32). The monitor (62) displays an image of the external environment taken by the imaging device (61).

Operation

As shown in FIG. 3, when the automobile (10) is driven, the first light blocking member (41) blocks the view (e) of the human (H) with respect to the external environment forward of the human (H) in the moving direction. In this state, the human (H) cannot directly recognize the external environment forward in the moving direction in the view (e) of the human (H). When the automobile (10) is driven, the view assistance device (60) is operated. The monitor (62) displays the image of the external environment forward in the moving direction taken by the imaging device (61). The human (H) can indirectly recognize the external environment forward of the vehicle body (20) in the moving direction by checking the image displayed on the monitor (62). The human (H) operates the steering wheel (34), the accelerator pedal (35), and the brake pedal (36) according to the image of the external environment displayed on the monitor (62). As a result, the automobile (10) can be driven in a state where the first light blocking member (41) blocks the view (e) of the human (H) with respect to the external environment forward of the human (H) in the moving direction.

Advantages of First Embodiment

According to the first embodiment, the automobile includes the vehicle body (20) that forms the accommodation space (S) for accommodating the human (H). The vehicle body (20) includes the light blocking member (40) that blocks light entering the vehicle body (20) from the front side in the moving direction, and the driving assistance unit (60, 70) that enables the mover body (20) to be driven in a state where the light blocking member (40) blocks the forward view of the human (H) in the moving direction of the vehicle body (20).

In other words, the first embodiment is directed to the automobile including the mover body (20) that forms the accommodation space (S) for accommodating the human (H). The mover body (20) includes: the light blocking member (40) that blocks the forward view of the human (H) in the moving direction of the mover body (20) being driven; and a driving assistance unit (60, 70) that enables the mover body (20) to be driven even though the light blocking member (40) blocks the forward view of the human (H) in the moving direction.

In this configuration, the light blocking member (40) can block the light from entering the accommodation space (S). This can reduce the amount of heat input to the accommodation space (S) by the entry of light. This can improve the comfort of the human (H), and can reduce an air conditioning load of the air conditioner (A). For example, when indoor humidity of the accommodation space (S) increases in winter, dew condensation occurs on the windshield to make the visibility poor. This requires limitation on the indoor humidity, or a means for defogging the windshield, such as a defroster. In this configuration, the driving is no longer restricted by the dew condensation. Thus, humidity conditions comfortable for the human can be provided.

In the first embodiment, the vehicle body (20) has the inclined portion (d) formed on the front side of the vehicle body (20) in the moving direction and inclined downward as it extends forward in the moving direction, and the light blocking member (40) includes the inclined portion (d).

The inclined portion (d) can reduce the air resistance to the moving vehicle body (20) moving forward. When the inclined portion (d), which has a relatively large area, is used as the windshield, the amount of light entering from the front side increases. In the first embodiment, the inclined portion (d) is comprised of the first light blocking member (41). This can effectively reduce the amount of the entering light. This can effectively reduce the amount of heat input to the accommodation space (S).

The first light blocking member (41) substantially entirely covers the front side of the accommodation space (S) in the moving direction. This configuration can reliably block the entry of light from the front side of the accommodation space (S). When the light blocking member (40) is arranged on the front side of the accommodation space (S), a wiper is no longer necessary unlike a general windshield, and no fogging is caused by dew condensation.

The light blocking member (40) entirely covers the accommodation space (S). This configuration can block the light from entering the accommodation space (S) from any direction and angle, and can substantially eliminate the amount of heat input by the entry of light.

The light blocking member (40) is made of a heat insulating material. This configuration can reliably reduce the amount of heat input to the accommodation space (S) due to transfer of heat other than light.

The driving assistance unit is configured as the view assistance device (60). The view assistance device (60) includes the imaging device (61) that takes an image on the front side of the vehicle body (20) in the moving direction, the display unit (62) positioned to be visible to the human (H) and displays the image taken by the imaging device (61), and the operation unit (34, 35, 36) that allows the human (H) to operate to drive the vehicle body (20).

With this configuration, the vehicle body (20) can be driven according to the image displayed on the display unit (62) even when the first light blocking member (41) blocks the view (e) of the human (H).

Variations of First Embodiment

Figure 4:
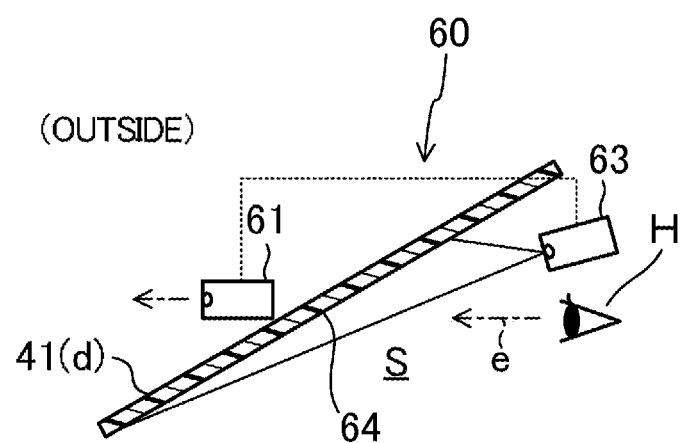
FIG. 4 is a configuration diagram schematically illustrating a first light blocking member and its surrounding structure according to a variation of the first embodiment.

The example shown in FIG. 4 differs from the first embodiment in the configuration of the view assistance device (60). A view assistance device (60) of this variation includes a projector (63) that outputs an image taken by the imaging device (61), and a screen (64) on which the image outputted by the projector (63) is thrown. The screen (64) is a display unit that displays the image taken by the imaging device (61). The screen (64) of the present variation is formed on an inner surface of the inclined portion (d) which is the first light blocking member (41). The inner surface of the first light blocking member (41) also serves as the screen (64) or the display unit.

The human (H) operates the steering wheel (34), the accelerator pedal (35), and the brake pedal (36) according to the image of the external environment displayed on the screen (64). As a result, the automobile (10) can be driven in a state where the first light blocking member (41) blocks the view (e) of the human (H) with respect to the external environment forward of the human (H) in the moving direction. When the inner surface of the first light blocking member (41) is used as the screen (64), the image projected on the screen (64) resembles the appearance of the actual external environment, which can improve usability of the automobile (10).

Second Embodiment

Figure 5:
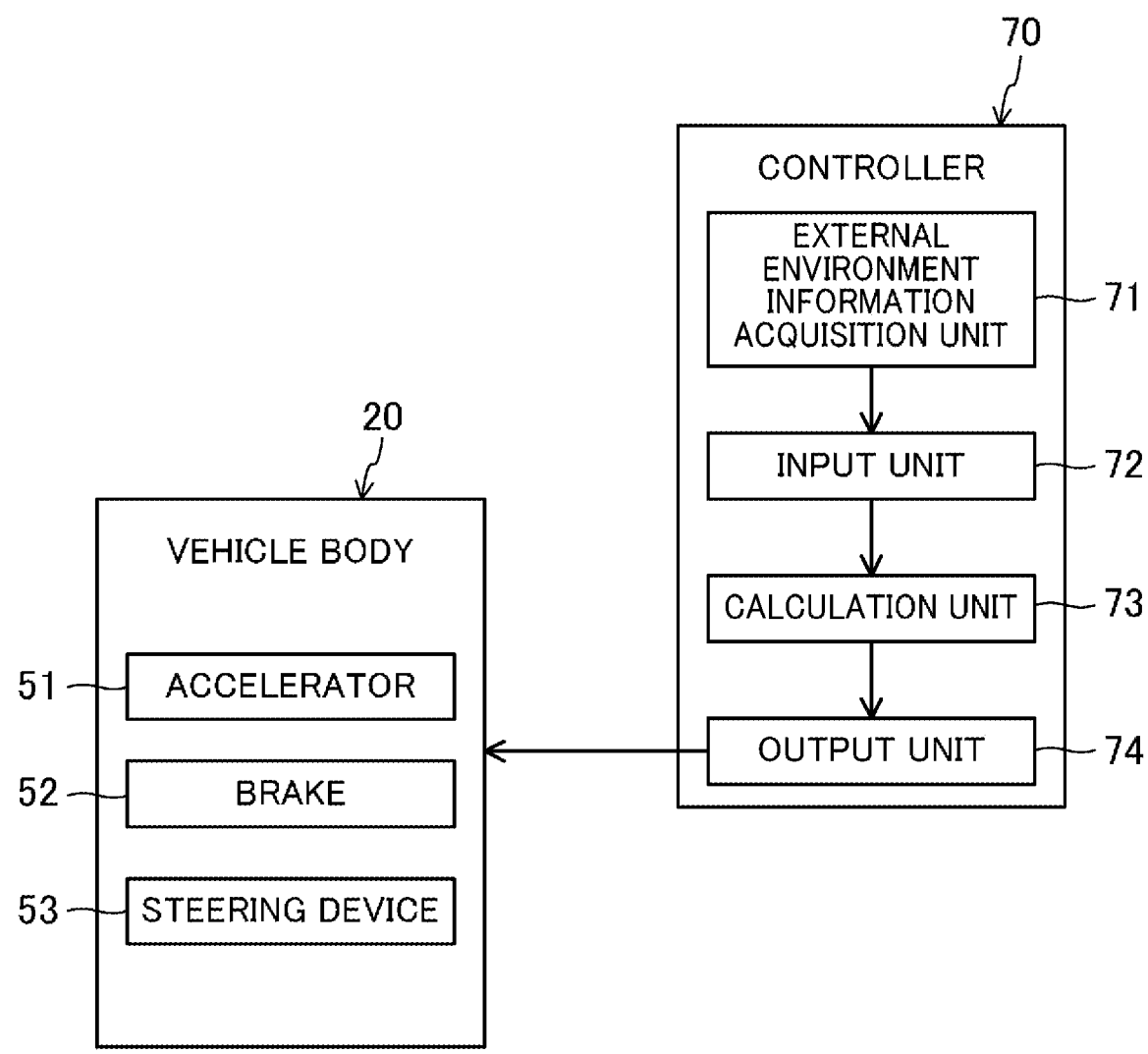
FIG. 5 is a block diagram illustrating a schematic configuration of an automobile according to a second embodiment.

An automobile (10) of the second embodiment differs from the automobile (10) of the first embodiment in the configuration of the driving assistance unit. As shown in FIG. 5, the driving assistance unit of the second embodiment includes a controller (70) that controls automatic driving of the vehicle body (20).

The controller (70) includes an external environment acquisition unit (71), an input unit (72), a calculation unit (73), and an output unit (74). The external environment acquisition unit (71) is configured as, e.g., Global Positioning System (GPS), a radar, and a camera, and acquires information of an external environment of the vehicle body (20). The information acquired by the external environment acquisition unit (71) is inputted to the input unit (72), and then processed by the calculation unit (73). The calculation unit (73) includes a microcomputer mounted on a control board, and a memory device (specifically, a semiconductor memory) that stores software for operating the microcomputer.

The calculation unit (73) calculates optimum control values for an accelerator (51), brake (52), and steering device (53) of the vehicle body (20) based on the external environment information. The calculation unit (73) may use artificial intelligence (AI). In this case, the calculation unit (73) uses the external environment information as an input parameter. The calculation unit (73) uses the control values for the accelerator (51), the brake (52), and the steering device (53) as output parameters. For the AI processing of the calculation unit (73), deep learning technology, reinforcement learning, and deep reinforcement learning can be used.

The control values obtained by the calculation unit (73) are appropriately outputted to the accelerator (51), the brake (52), and the steering device (53) via the output unit (74). Automatic driving of the vehicle body (20) is controlled in accordance with these control values. As a result, the automobile (10) can be driven in a state where the first light blocking member (41) blocks the view of the human (H) with respect to the external environment forward of the human (H) in the moving direction.

In the second embodiment, the operation unit (the steering wheel (34), the accelerator pedal (35), and the brake pedal (36)) may be omitted as long as the automatic driving is constantly performed.

VARIATIONS OF EMBODIMENT

The first and second embodiments described above may be modified as follows.

First Variation

Figure 6:
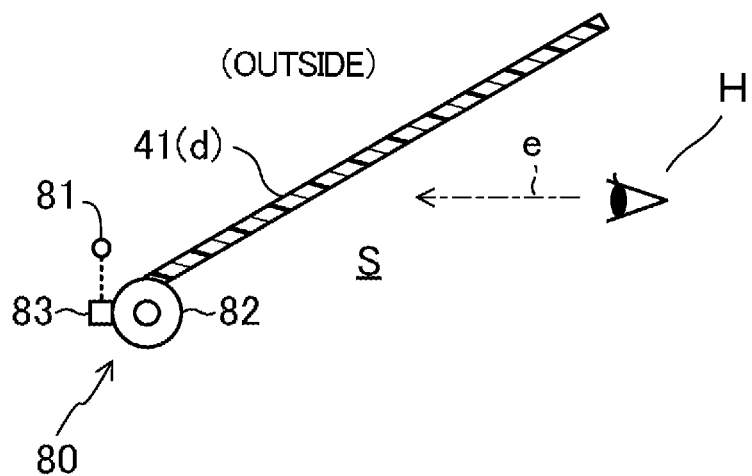
FIG. 6 is a configuration diagram schematically illustrating a first light blocking member and its surrounding structure in a first state according to a first variation.
Figure 7:
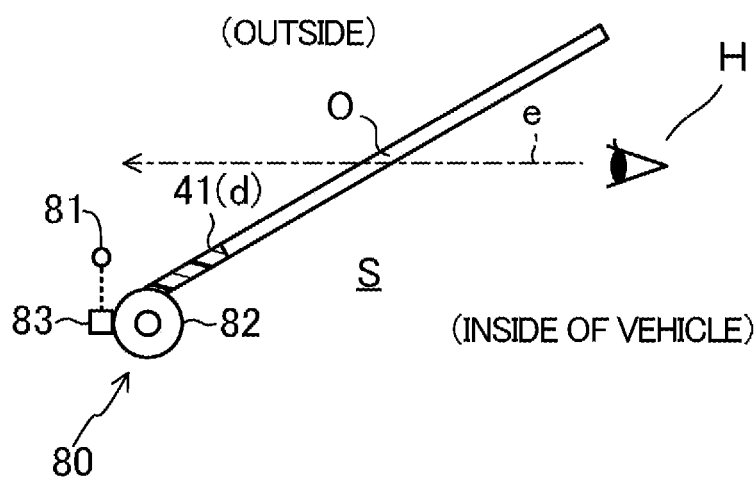
FIG. 7 is a configuration diagram schematically illustrating the first light blocking member and its surrounding structure in a second state according to the first variation.

An automobile (10) of a first variation shown in FIGS. 6 and 7 includes a switching mechanism (80). The switching mechanism (80) switches the first light blocking member (41) between a first state and a second state. The first light blocking member (41) in the first state shown in FIG. 6 blocks the forward view (e) of the human (H) in the moving direction of the vehicle body (20). The first light blocking member (41) in the second state shown in FIG. 7 stops blocking of the forward view (e) of the human (H) in the moving direction of the vehicle body (20).

The switching mechanism (80) includes a solar radiation amount sensor (81), a drive device (82), and a drive control unit (83).

The solar radiation amount sensor (81) is a detector that detects the amount of solar radiation (sunlight) emitted from the outside. The detector may be another sensor as long as it can detect an index indicating the amount of heat input from the outside to inside of the accommodation space (S). The detector may detect other indices such as the intensity of light, the temperature of outdoor air, and the temperature of indoor air. The solar radiation amount sensor (81) is disposed on the front side of the vehicle body (20). The solar radiation amount sensor (81) is attached to, for example, the front hood (22), the front pillar (23), or a front portion of the roof (21).

The drive device (82) drives the first light blocking member (41). Specifically, the drive device (82) of the present variation is rotationally driven by an electric motor to wind the first light blocking member (41). The drive device (82) adjusts the length of the first light blocking member (41) in a longitudinal direction so that an upper end of the first light blocking member (41) extends from the drive device (82) to the roof (21) (a first state shown in FIG. 6) or the upper end of the first light blocking member (41) is located near the drive device (82) (a second state shown in FIG. 7). The drive device (82) is not necessarily a winding device as long as it switches the first light blocking member (41) between the first state and the second state. The drive device (82) may be configured to displace the first light blocking member (41) to another position, fold the first light blocking member (41), or turn the first light blocking member (41).

The drive control unit (83) controls the drive device (82) according to a detection value of the solar radiation amount sensor (81). The drive control unit (83) controls the drive device (82) such that the first light blocking member (41) is in the first state when the amount of solar radiation detected by the solar radiation amount sensor (81) exceeds a first value. Through this control, the front side of the accommodation space (S) is covered with the first light blocking member (41) when the amount of solar radiation is relatively large. The first light blocking member (41) in the first state blocks light from entering the inside of the accommodation space (S). In the state shown in FIG. 6, the vehicle body (20) can be driven under automatic driving control by the view assistance device (60) of the first embodiment or the controller (70) of the second embodiment.

The drive control unit (83) controls the drive device (82) such that the first light blocking member (41) is in the second state when the amount of solar radiation detected by the solar radiation amount sensor (81) falls below a second value. The second value is equal to or smaller than the first value. Through this control, the front side of the accommodation space (S) is opened to the outside when the amount of solar radiation is relatively small.

The vehicle body (20) has an opening (O) surrounded by the front end of the roof (21), the pair of front pillars (23), and the rear end of the front hood (22). The opening (O) is formed at a position corresponding to the forward view (e) of the human (H) in the moving direction. The human (H) can directly see the forward external environment in the moving direction through the opening (O). In this state, the human (H) can drive the vehicle body (20) by operating the operation unit.

When the switching mechanism (80) of the first variation is applied to the second embodiment, the first light blocking member (41) may be switched between the first state and the second state in accordance with the switching between the manual driving by the human (H) and the automatically controlled driving described above. During the manual driving by the human (H), the drive device (82) is controlled so that the first light blocking member (41) is in the second state. In this state, the human (H) operates the operation unit while directly looking at the external environment. During the automatically controlled driving, the drive device (82) is controlled so that the first light blocking member (41) is in the first state. In this state, the vehicle body (20) is automatically driven with the view (e) of the human (H) blocked by the first light blocking member (41).

Second Variation

Figure 8:
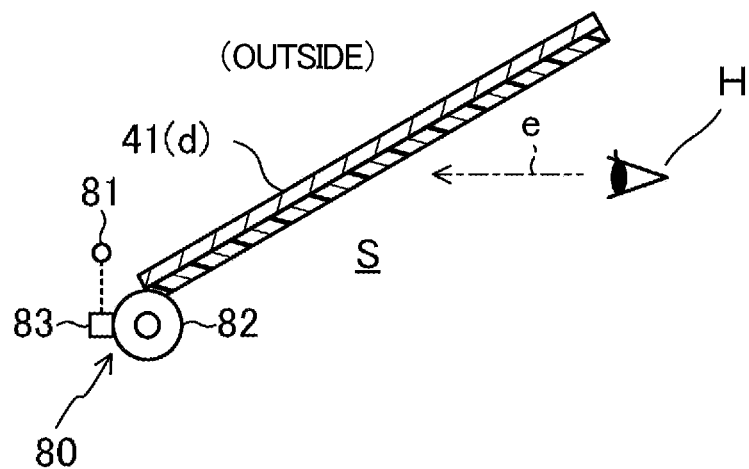
FIG. 8 is a configuration diagram schematically illustrating a first light blocking member and its surrounding structure in a first state according to a second variation.
Figure 9:
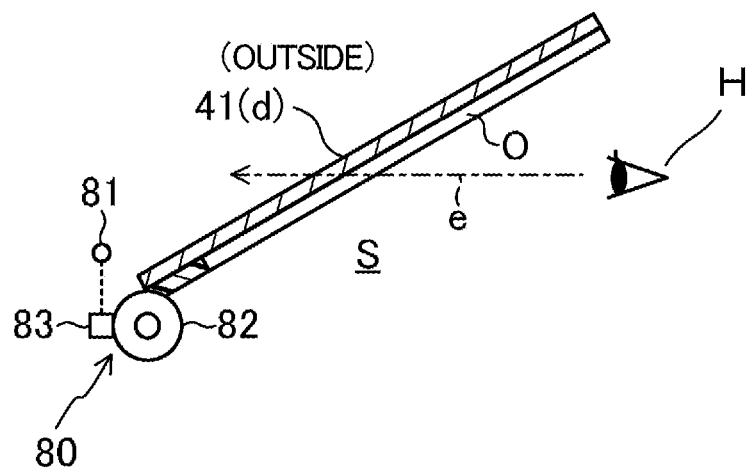
FIG. 9 is a configuration diagram schematically illustrating the first light blocking member and its surrounding structure in a second state according to the second variation.

An automobile (10) of a second variation shown in FIGS. 8 and 9 includes a windshield (45) which is a visible member. The windshield (45) overlaps with the first light blocking member (41) in a thickness direction thereof, and is made of a transparent or translucent material. The windshield (45) is inclined along the inclined portion (d) which is the first light blocking member (41). In this variation, the windshield (45) is provided outside the first light blocking member (41). The windshield (45) may be provided inside the first light blocking member (41).

Although not shown, the automobile (10) may include a rear window which is a visible member. The rear window overlaps with the second light blocking member (42) in a thickness direction thereof, and is made of a transparent or translucent material.

The first light blocking member (41) is more heat insulating than the windshield (45). The strength of the first light blocking member (41) at the time of collision of the automobile (10) is greater than the strength of the windshield (45) at the time of collision of the automobile (10). The first light blocking member (41) is as thick as or thicker than the windshield (45).

The automobile (10) of the second variation includes a switching mechanism (80) similar to that of the first variation. The first light blocking member (41) is displaced along the windshield (45) to be switched between the first state and the second state.

When the amount of solar radiation detected by the solar radiation amount sensor (81) exceeds the first value, the first light blocking member (41) is brought into the first state shown in FIG. 8. In this state, the first light blocking member (41) entirely covers the windshield (45). The first light blocking member (41) in the first state blocks light from entering the inside of the accommodation space (S). In the state shown in FIG. 8, the vehicle body (20) can be driven under automatic driving control by the view assistance device (60) of the first embodiment or the controller (70) of the second embodiment.

When the amount of solar radiation detected by the solar radiation amount sensor (81) falls below the second value, the first light blocking member (41) is brought into the second state shown in FIG. 9. In this state, the opening (O) is formed inside the windshield (45) in the same manner as in the first variation. The opening (O) is formed at a position corresponding to the forward view (e) of the human (H) in the moving direction. The human (H) can directly look at the forward external environment in the moving direction through the opening (O) and the windshield (45). In this state, the human (H) can drive the vehicle body (20) by operating the operation unit. During this operation, the windshield (45) can block wind from entering the accommodation space (S).

Even when the switching mechanism (80) of the second variation is employed, the first light blocking member (41) may be brought into the second state during the manual driving by the human (H), and the first light blocking member (41) may be brought into the first state during automatically controlled driving.

In the second variation, the switching mechanism (80) may be omitted.

Third Variation

Figure 10:
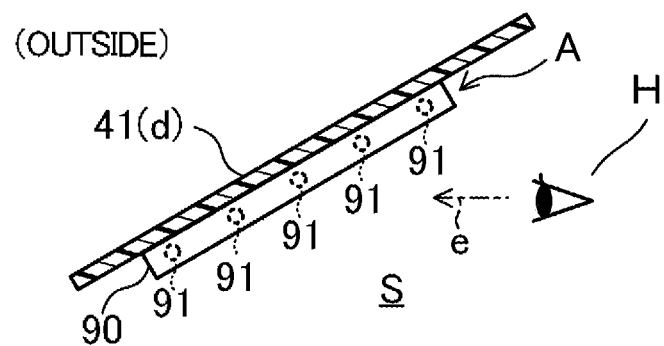
FIG. 10 is a configuration diagram schematically illustrating a first light blocking member and its surrounding structure according to a third variation.

In an automobile (10) of a third variation shown in FIG. 10, the first light blocking member (41) is provided with an air conditioner (A). The air conditioner (A) of this example includes a substantially plate-shaped heat transfer member (90) and flow passages (91) formed inside the heat transfer member (90). The heat transfer member (90) is attached to an inner surface of the first light blocking member (41). The heat transfer member (90) is exposed in the accommodation space (S). A heating medium for cooling or heating the accommodation space (S) flows through the flow passages (91). The heat transfer member (90) transfers heat between the heating medium flowing through the flow passages (91) and the air in the accommodation space (S).

When the air conditioner (A) performs the cooling, the heating medium for cooling flows through the flow passages (91). The heating medium is, for example, cold water. The heat of the air in the accommodation space (S) is transferred to the heating medium in the flow passages (91) through the heat transfer member (90). When the air conditioner (A) performs the heating, a heating medium for heating flows through the flow passages (91). The heating medium is, for example, hot water. The heat of the heating medium in the flow passages (91) is transferred to the air in the accommodation space (S) through the heat transfer member (90). During the heating, radiant heat is released from the heat transfer member (90). In other words, the heat transfer member (90) constitutes a radiation panel.

In the third variation, the heat transfer member (90) of the air conditioner (A) also serves as the light blocking member. The first light blocking member (41) also serves as a mounting surface for the heat transfer member (90).

The air conditioner (A) is not limited to this configuration. The air outlet of the air conditioner (A) may be provided in the first light blocking member (41).

The air conditioner (A) may be a refrigeration cycle refrigerator that circulates a compressed refrigerant through a refrigerant circuit to perform a vapor compression refrigeration cycle. The air conditioner (A) may be an adsorption refrigerator that has two adsorbent heat exchangers, an evaporator, and a condenser, and causes the two adsorbent heat exchangers to alternately repeat adsorption and desorption. The exhaust heat of the automobile (10) can be used to regenerate the adsorbent of the adsorbent heat exchangers. The air conditioner (A) may be a heater disposed on the seat (32), for example.

Fourth Variation

Figure 11:
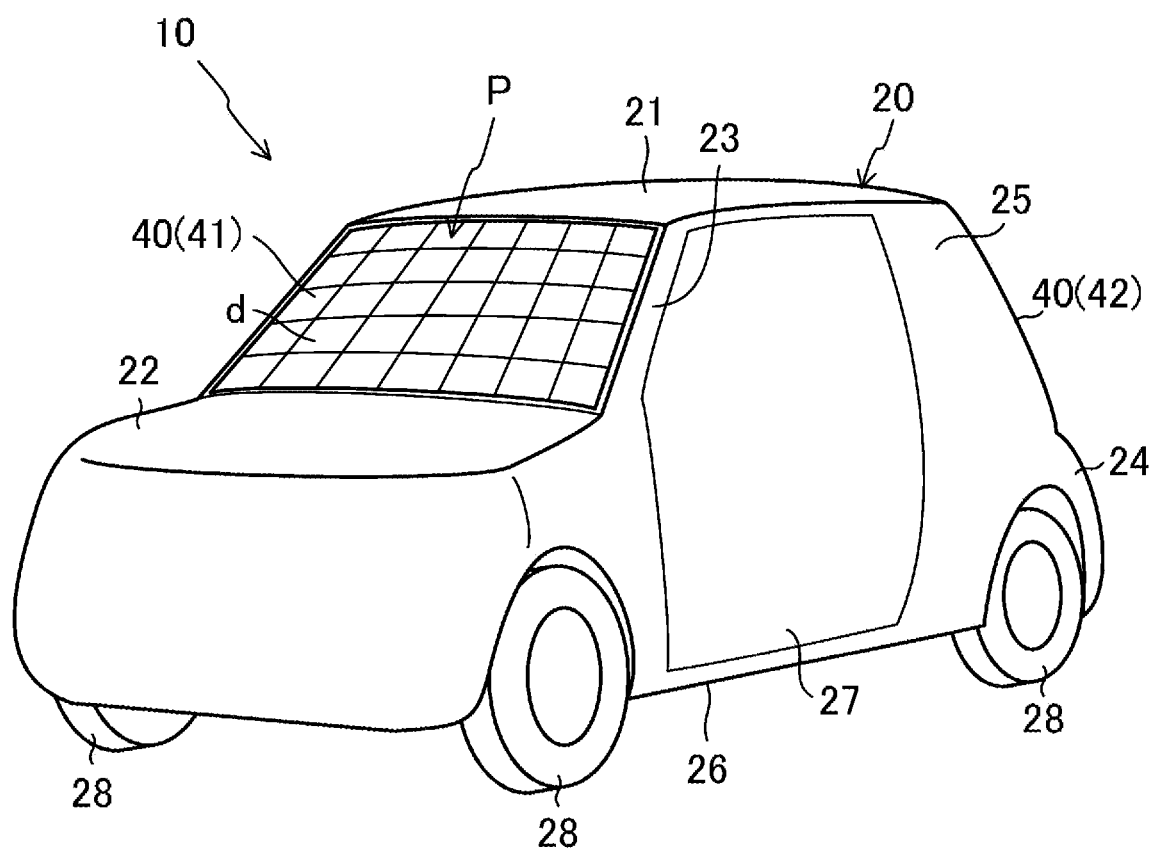
FIG. 11 is a perspective view illustrating a schematic configuration of an automobile according to a fourth variation.

As shown in FIG. 11, the first light blocking member (41) of the automobile (10) is entirely made of a solar panel (P).

In other words, the solar panel (P) also serves as the light blocking member. The first light blocking member (41) is formed into the inclined portion (d) and has a relatively large area. When the solar panel (P) is used as the first light blocking member (41) having a large area, the sunlight can be received on a sufficient area, and the entry of light and heat into the accommodation space (S) can be blocked using the solar panel (P). The electric power generated by the solar panel (P) is used as energy for the automobile (10). The light blocking member (40) may be partially made of the solar panel (P).

OTHER EMBODIMENTS

The embodiments, variations and other examples described above may be modified in the following manner.

The light blocking member does not necessarily cover the entire accommodation space (S). The light blocking member may substantially entirely cover the front side of the accommodation space (S) in the moving direction of the mover body. Here, the "front side in the moving direction" means the front side of the mover body when the mover body moves forward. The "front side in the moving direction" also means the rear side of the mover body (a side toward the rear pillars (25)) when the mover body moves rearward. When the mover body moves rearward, the second light blocking member (42), if located on the side of the rear pillars (25), blocks the rear view of the human (forward in the moving direction). Even in this state, the driving assistance unit (60, 70) enables the mover body to be driven rearward.

The side door (27) of the automobile (10) may be provided with a side window or a side glass. Each of the front pillars (23) may be provided with a side mirror.

The mover body may be provided with a ventilator. The ventilator includes an air supply portion for supplying outdoor air to the accommodation space (S) and an exhaust portion for exhausting the air in the accommodation space (S) to the outside.

The mover body may be provided with a gas treatment device. The gas treatment device removes carbon dioxide and other odor components in the accommodation space (S). The gas treatment device may be configured to use electrical discharge, adsorption, and a separation membrane.

The mover body may be provided with a humidity controller for controlling the humidity of the accommodation space (S).

The traffic mover is not limited to the automobile (10). Examples of the traffic mover include railroad vehicles, ships, aircrafts, and manned drones.

While the embodiment and variations thereof have been described above, it will be understood that various changes in form and details may be made without departing from the spirit and scope of the claims. The embodiments, the variations, and the other embodiments may be combined and replaced with each other without deteriorating intended functions of the present disclosure. The expressions of "first," "second," and "third" described above are used to distinguish the terms to which these expressions are given, and do not limit the number and order of the terms.

The present disclosure is useful for traffic movers and automobiles.

The invention claimed is:

1. A traffic mover comprising:
   a mover body forming an accommodation space configured to accommodate a human, the mover body including a light blocking member that blocks light entering from a front side of the mover body in a moving direction of the mover body, and a driving assistance unit configured to enable the mover body to be driven when the light blocking member blocks a forward view of the human in the moving direction of the mover body, and a radiation panel exposed to the accommodation space, the radiation panel being a heat transfer member configured to cool or heat air, the radiation panel being provided on an inner surface of the light blocking member, a plurality of flow passages being formed inside the radiation panel.

2. The traffic mover of claim 1, wherein
the light blocking member includes an inclined portion
formed on the front side of the mover body in the moving direction and
inclined downward as the inclined portion extends forward in the moving direction.

3. An automobile including the traffic mover of claim 2.

4. The traffic mover of claim 1, wherein
the light blocking member substantially entirely covers a front side of the accommodation space in the moving direction.

5. An automobile including the traffic mover of claim 4.

6. The traffic mover of claim 1, wherein
the light blocking member entirely covers the accommodation space.

7. An automobile including the traffic mover of claim 6.

8. The traffic mover of claim 1, wherein
the light blocking member is constructed of a heat insulating material.

9. An automobile including the traffic mover of claim 8.

10. The traffic mover of claim 1, wherein
the driving assistance unit includes a view assistance device, and the view assistance device includes
a camera configured to obtain an image on the front side of the mover body in the moving direction,
a display unit positioned to be visible to the human and configured to display the image obtained by the camera, and
an operation unit configured to allow the human to operate to drive the mover body.

11. An automobile including the traffic mover of claim 10.

12. The traffic mover of claim 1, wherein
the driving assistance unit includes a controller configured to automatically control driving of the mover body.

13. An automobile including the traffic mover of claim 12.

14. The traffic mover of claim 1, further comprising:
a visible member overlapping with the light blocking member in a thickness direction of the visible member, the visible member being constructed of a transparent or translucent material.

15. An automobile including the traffic mover of claim 14.

16. The traffic mover of claim 1, further comprising:
a switch configured to switch the light blocking member between a first state and a second state,
the light blocking member in the first state blocking the forward view of the human in the moving direction, and
the light blocking member in the second state not blocking the forward view of the human in the moving direction.

17. The traffic mover of claim 16, further comprising:
a sensor configured to detect an index indicating an amount of heat input from outside to inside of the accommodation space,
the switch being configured to switch the light blocking member between the first state and the second state based on a detection value of the sensor.

18. An automobile including the traffic mover of claim 16.

19. The traffic mover of claim 1, wherein
the light blocking member is at least partially configured as a solar panel.

20. An automobile including the traffic mover of claim 1.

* * * * *